United States Patent
Morgan et al.

(10) Patent No.: US 12,427,563 B2
(45) Date of Patent: Sep. 30, 2025

(54) HIGH PRODUCTION QUALITY ROUND WIRE ROD USING A SLIT ROLLING PROCESS

(71) Applicant: PRIMETALS TECHNOLOGIES USA LLC, Alpharetta, GA (US)

(72) Inventors: Steven Morgan, Neath Port Talbot (GB); Matthew D. Palfreman, Charlton, MA (US)

(73) Assignee: Primetals Technologies USA LLC, Alpharetta, GA (US)

( * ) Notice: Subject to any disclaimer, the term of this patent is extended or adjusted under 35 U.S.C. 154(b) by 0 days.

(21) Appl. No.: 18/684,252

(22) PCT Filed: Sep. 22, 2021

(86) PCT No.: PCT/US2021/051420
§ 371 (c)(1),
(2) Date: Feb. 16, 2024

(87) PCT Pub. No.: WO2023/048702
PCT Pub. Date: Mar. 30, 2023

(65) Prior Publication Data
US 2024/0238858 A1    Jul. 18, 2024

(51) Int. Cl.
*B21C 37/04* (2006.01)
*B21B 1/16* (2006.01)
*B21B 15/00* (2006.01)

(52) U.S. Cl.
CPC .............. *B21C 37/045* (2013.01); *B21B 1/16* (2013.01); *B21B 15/0007* (2013.01); *B21B 2015/0021* (2013.01)

(58) Field of Classification Search
CPC ........ B21D 28/02; B21D 28/06; B21D 28/12; B21D 28/14; B21C 37/045; B21B 1/16;
(Continued)

(56) References Cited

U.S. PATENT DOCUMENTS 4,357,819 A * 11/1982 Elley ...................... B21B 1/0815
  72/204
4,779,439 A * 10/1988 Baldi ..................... B21B 1/0815
  72/204
(Continued)

FOREIGN PATENT DOCUMENTS

DE    2553088 A1    8/1976
EP    0532856 A1    3/1993
(Continued)

OTHER PUBLICATIONS

International Search Report and Written Opinion issued on May 20, 2022 in related PCT Application No. PCT/US2021/051420.
(Continued)

*Primary Examiner* — Sarang Afzali
*Assistant Examiner* — Darrell C Ford
(74) *Attorney, Agent, or Firm* — Gesmer Updegrove LLP

(57) ABSTRACT

Disclosed within is a slit section pass formation unit having a pair of rolls and a de-ribbing means, where the pair of rolls has a roll profile configured to produce a pair of slit rods with symmetrical dimensions, the pair of slit rods connected via a rib, and the de-ribbing means to remove the rib in its entirety forming a first slit rod and a second slit rod.

7 Claims, 9 Drawing Sheets

(58) Field of Classification Search
CPC .... B26F 1/20; Y10T 83/0467; Y10T 83/0491; Y10T 83/0572; Y10T 83/8796; Y10T 83/9435
USPC ................ 83/689, 595, 596, 49, 27, 32, 945
See application file for complete search history.

(56) References Cited

U.S. PATENT DOCUMENTS

| | | | | | |
|---|---|---|---|---|---|
| 5,027,632 | A | * | 7/1991 | Pong .......................... | B21B 1/18 72/235 |
| 5,174,142 | A | * | 12/1992 | Pong ..................... | B21B 39/165 72/428 |
| 5,548,986 | A | * | 8/1996 | Matsuo ................. | B21B 1/0815 72/204 |
| 5,626,044 | A | * | 5/1997 | Lara-Castro .......... | B21B 1/0815 72/203 |
| 12,269,079 | B2 | * | 4/2025 | Sasaki ....................... | B21B 1/16 |

FOREIGN PATENT DOCUMENTS

| | | |
|---|---|---|
| EP | 0612274 A1 | 8/1994 |
| JP | S6167502 | 7/1986 |
| WO | 2021107378 A1 | 6/2021 |

OTHER PUBLICATIONS

International Preliminary Report on Patentability issued on Mar. 26, 2024 in related PCT Application No. PCT/US2021/051420.

* cited by examiner

HIGH PRODUCTION QUALITY ROUND WIRE ROD USING A SLIT ROLLING PROCESS

RELATED INFORMATION

This application is a 371 of PCT Application No. PCT/US2021/51420 filed Sep. 22, 2021, which is herein incorporated by reference.

BACKGROUND OF THE INVENTION

Field of Invention

The present invention relates generally to the field of wire rod mills. More specifically, the present invention is related to a novel slit section pass formation in a wire rod mills.

Discussion of Related Art

Rolling small product on a wire rod mill limits the production rate (expressed in tons per hour or t/hr) to a level less than the re-heat furnace capacity. As an example, rolling for diameters of 5.5 mm at 115 m/s results in a production rate of +70 t/hr, which is less than 50% of the capacity of a typical re-heat furnace. Full furnace rate utilization is generally achieved on diameters of 8.0 mm and greater. Various solutions have been attempted in the prior art to address this problem.

One solution involves rolling a twin strand, i.e., rolling two billets in the mill at one time, and finishing them in individual finishing lines. The experimental use of accumulators such as the Morgan MorShor®, etc. are also known in the art. However, such prior art machines did not function as intended, as the material can never be controlled well enough to make the process reliable. Other prior art solutions such as Danieli Twin MIDAR relies on casting two billets at the same time, rolling the twin strand in parallel and diverting them to each finishing line. Such solutions create quality problems as the billet casting speed is too high for many products.

The prior art does not provide quality plain round wire rod materials. To increase production, a mill may roll two billets simultaneously and feed them to individual finishing mill lines, this limits the quality of the rod that can be produced as the mill spring becomes more prominent under these loading conditions resulting in a loss of control of the section being rolled and thus the final tolerance of the material. It raises significant challenges when it comes to balancing the quenching of the individual lines and producing the same metallurgical properties of the finished material from the same heat of steel.

Slitting technology has been around for many years and is utilized for the production of deformed or ribbed construction material where, generally in the prior art, tolerance and surface quality are not of the upmost importance. Such technology is particularly used on bar mills to produce multiple finished sections from a single line of material rolled in the roughing and intermediate mill. However, it is noted that this process has not been carried over to the wire rod mill process due to the inability of the slitting section to be controlled tightly enough to produce the needed feed section accuracy and the inability to remove the rib required in a slitting feed known as the slit pass.

Embodiments of the present invention are an improvement over prior art systems and methods.

SUMMARY OF THE INVENTION

In one embodiment, the present invention provides a slit section pass formation unit comprising: a pair of rolls, the pair of rolls having a roll profile configured to produce a pair of slit rods with symmetrical dimensions, the pair of slit rods connected via a rib; and a de-ribbing means to remove the rib in its entirety forming a first slit rod and a second slit rod.

In another embodiment, the present invention provides a slit section pass formation unit comprising: a pair of rolls, the pair of rolls having a roll profile configured to produce a pair of slit rods with symmetrical dimensions, the pair of slit rods connected via a rib; and a de-ribbing means to remove the rib in its entirety forming a first slit rod and a second slit rod, and wherein the slit section pass formation unit is part of a wire rod mill.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
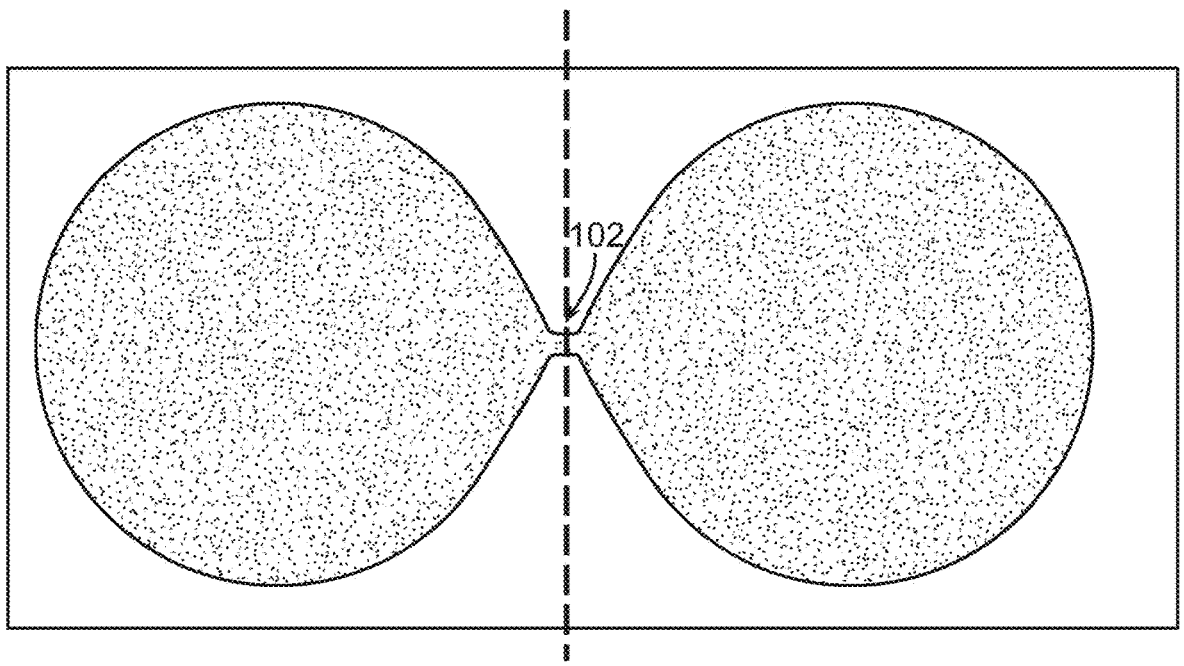
FIG. 1 depicts a lack of symmetry in the slit section of the prior art.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

As noted earlier, a key problem with the prior art is the inability to remove the rib required in a slitting feed known as the slit pass. If this rib is not fully removed for plain rod it can be rolled into the material creating laps and seems that will be manifest in the finished product and/or failures of the components made from the rod.

If the slit section can be produced correctly and accurately and the slit rib removed, wire rod material can be produced using a slitting process. The present invention provides a system and method for the removal of the rib and the control of profile to be slit.

Producing quality wire rod from a state-of-the-art slit section is not possible in part due to its lack of symmetry. FIG. 1 depicts such a lack of symmetry in the prior art. FIG. 1 also depicts the rib 100 that is formed in the prior art, where the prior art does not have a process to totally remove the rib. A typical slit section is torn apart in the region of the rib, where the rib is purposely produced to be torn along the dotted line depicted (where such a tear inevitably results in a portion of the rib remaining behind in each of the partitioned halves). The inability to totally remove the rib (that can then become a defect in a finished plain round wire rod) is the limiting factor for such a prior art process.

Figure 2:
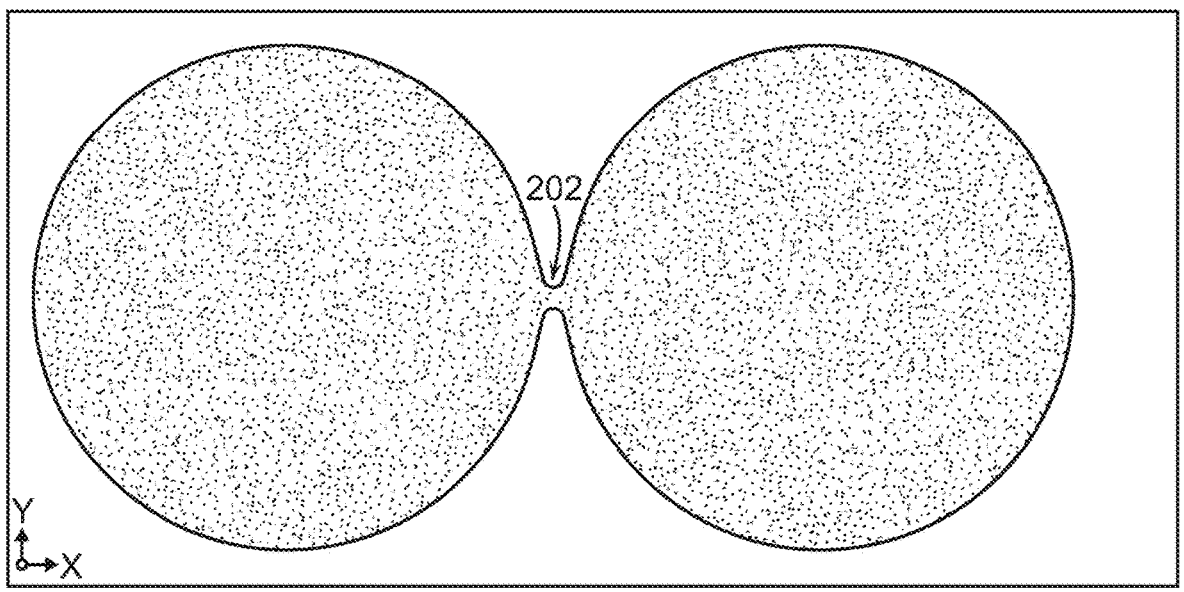
FIG. 2 depicts a slit section as per the teachings of the present invention showing symmetry.

The present invention redefines the slit section pass formation. FIG. 2 depicts a slit section as per the teachings of the present invention, wherein the slit section is near perfectly symmetrical (compared to FIG. 1) and rib 202 has been reconfigured to allow it to become waste material that will be totally removed from the rolling process. The symmetry is achieved by changing the pass progression and the grooves in the roll to make the symmetrical rounds. In the present invention, a symmetrical round section can be achieved, as a slitting device or static knife is no longer needed to separate the two halves of the section. In the prior art, the lack of symmetry was purposely designed to allow operational clearance for the knife. In order to make the new symmetrical section, the profile of the mill groove is re-designed to allow for a larger fill ratio. A key aspect of this change in profile is that it is only possible with the new slitting process and the symmetrical nature of the new sections provided after the slitting process allows for the process to be used by higher quality manufacturing plants.

Having a symmetrical feed to the finishing mill with no left-over rib ensures a quality round bar may be produced. These rounds can either be produced in individual finishing lines or in a combined finishing line/mill that can roll two finished sections concurrently, thus saving equipment cost and complication.

The removal of the rib can be completed via varying methods.

Figure 3A:
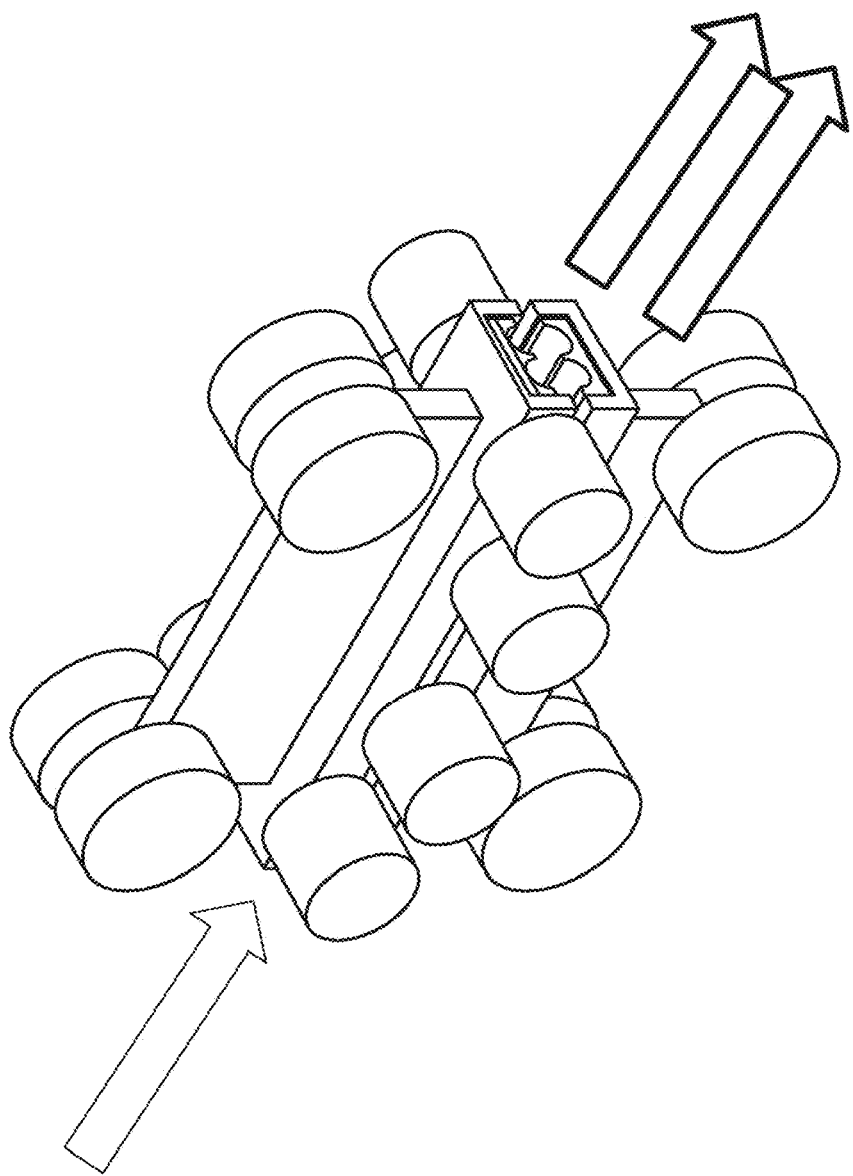
FIG. 3A depicts the apparatus used in the present invention's punch and die method used for rib removal.
Figure 3A:
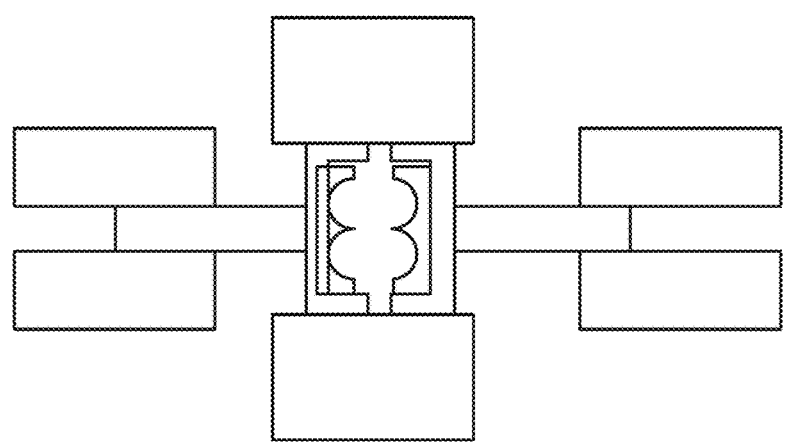
Figure 3B:
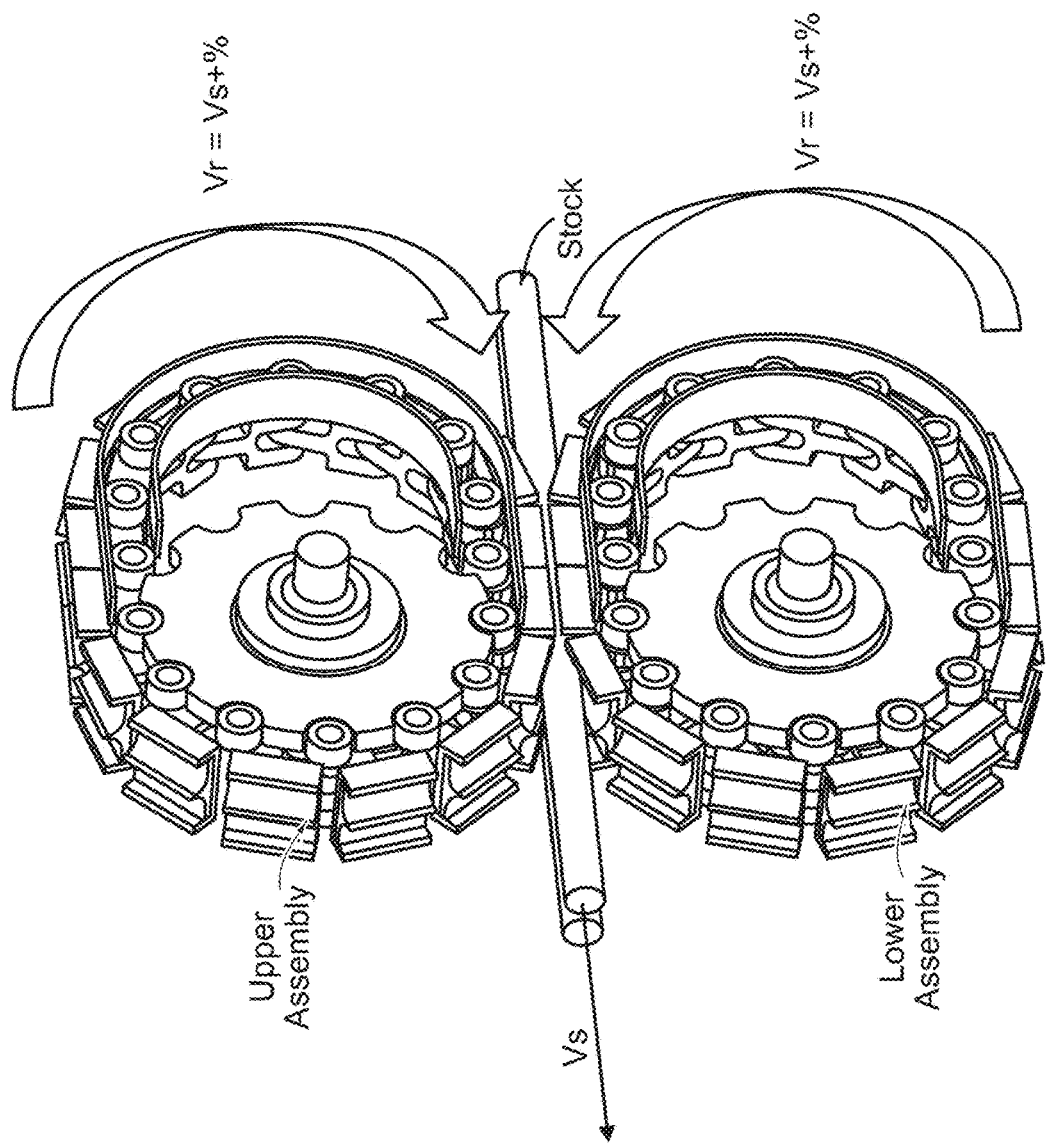
FIG. 3B depicts an upper knife and a lower knife along with a tread driven at speed Vr and a stock being driven at speed Vs.
Figure 3B:
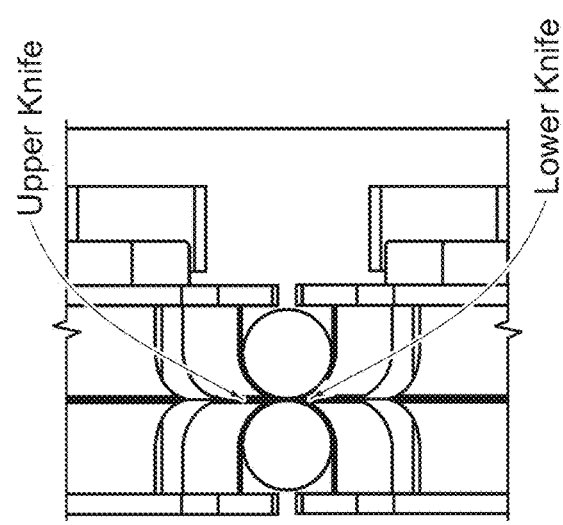
Figure 3C:
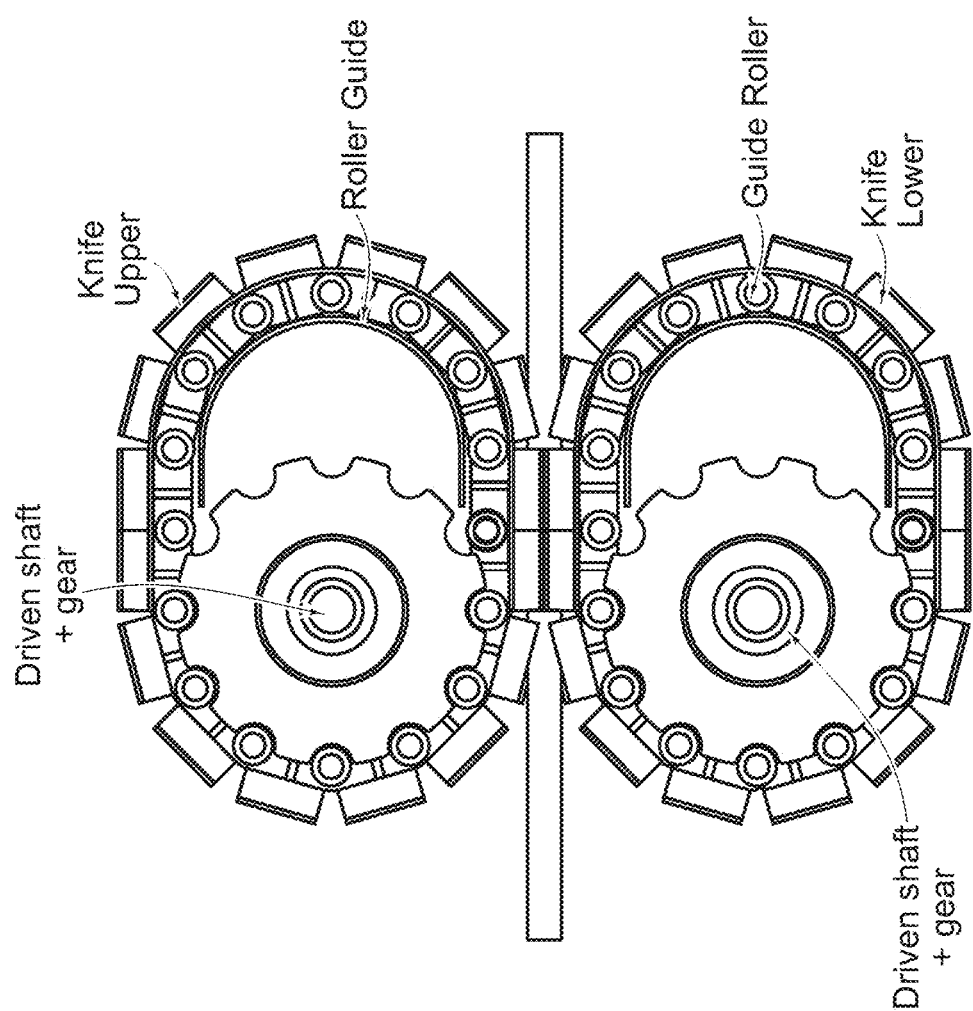
FIG. 3C depicts gears that move the upper knife and lower knife in the punch and die method used for rib removal.
Figure 3C:
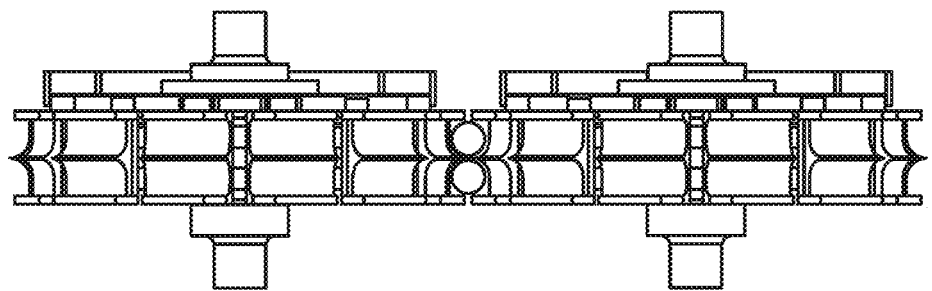

In one embodiment, the method employed for complete removal of the rib is a punch and die method where a custom de-flashing-de-ribbing process is provided. FIGS. 3A-C depict such a custom process. Many of these dies are arranged on a track similar to the tread of a tank. The tread is driven at the speed of the material being de-flashed (Vs) and may also be driven at a slightly, higher speed (Vr) to ensure the material being processed is not hindered in its forward progress through the plant. Vr=Vs+a percentage lead speed up to 3%. The dies match the shape of the section to be de-flashed—de-ribbed; the upper and lower dies interface with each other to remove the steel rib between the two processes sections in its entirety. The steel rib joining the two symmetrical rounds is removed, unlike the present method of slitting which pulls the two halves apart tearing the rib, with it still being part or connected to the round.

Figure 4A:
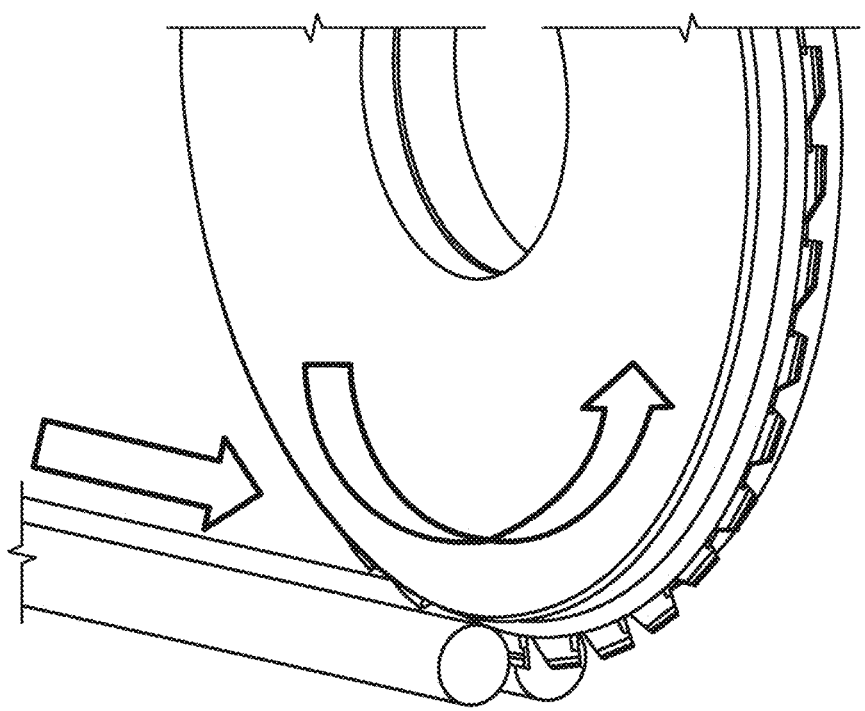
FIG. 4A illustrates complete removal of the rib using abrasive wheel technology or cutting wheel technology according to an embodiment of the present invention.

In another embodiment, the method employed complete removal of the rib involves the use of abrasive wheel technology or cutting wheel technology, which removes the rib in its entirety. FIG. 4A depicts such a process. The abrasive wheel would replace the current slitting knife that effectively pulls the material apart. It works similar to an abrasive wheel in that all of the ribs material is removed from the parent material.

In yet another embodiment, the method employed for complete removal of the rib involves the use of a high-speed cutting tool.

Figure 4B:
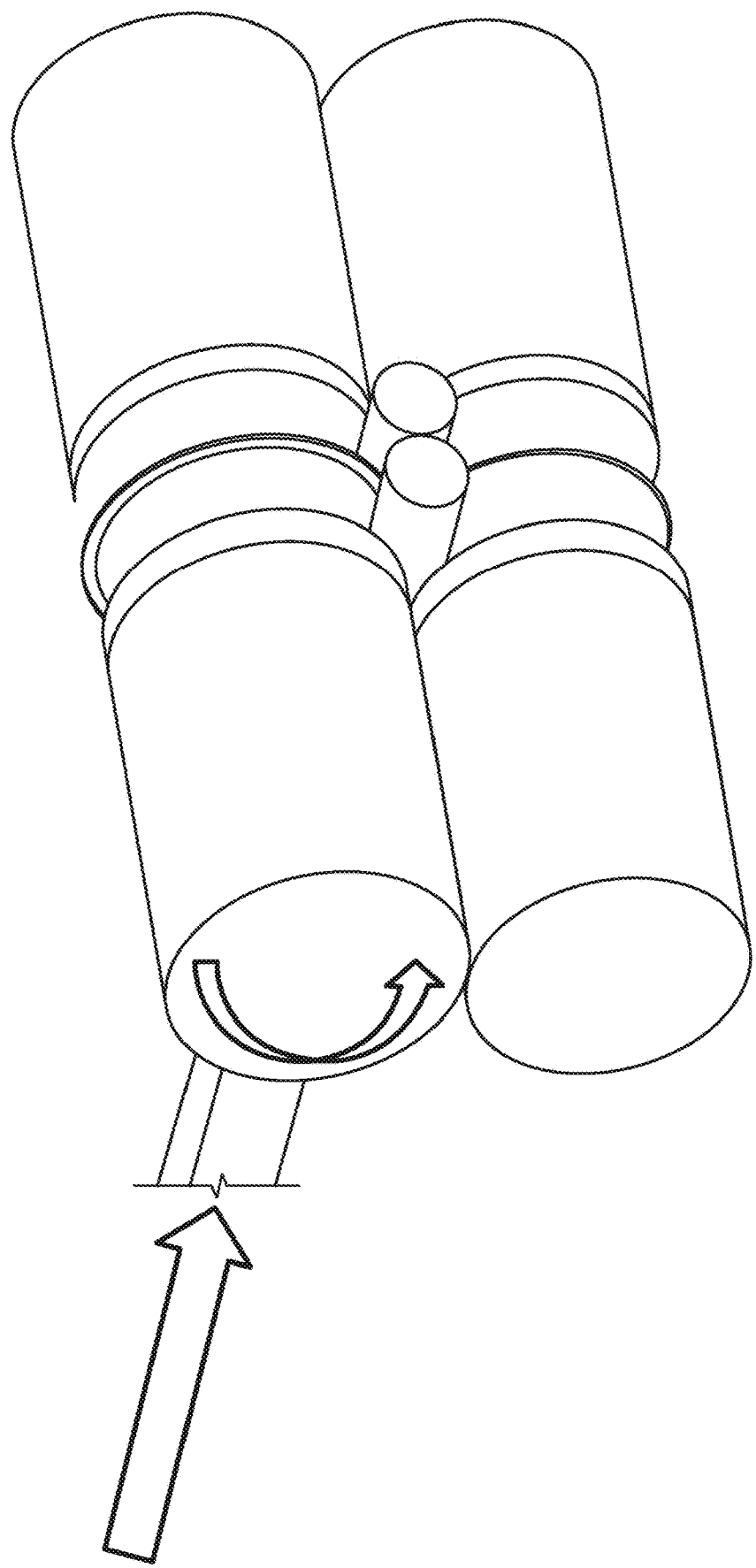
FIG. 4B illustrates an interlocking slit roll arrangement designed to peel the rib from the rolling processing according to an embodiment of the present invention.

In yet another embodiment, the method employed for complete removal of the rib involves an interlocking slit roll arrangement designed to peel the rib from the rolling process. FIG. 4B depicts such a process. This method emulates the method shown in FIG. 3B however it is directly incorporated in to the roll in a rolling stand or in the rolls of a guide following a rolling stand. This method reduces the need for extra equipment space, however will require more frequent maintenance due to the reduced cutting-de-flashing surface.

Figure 5A:
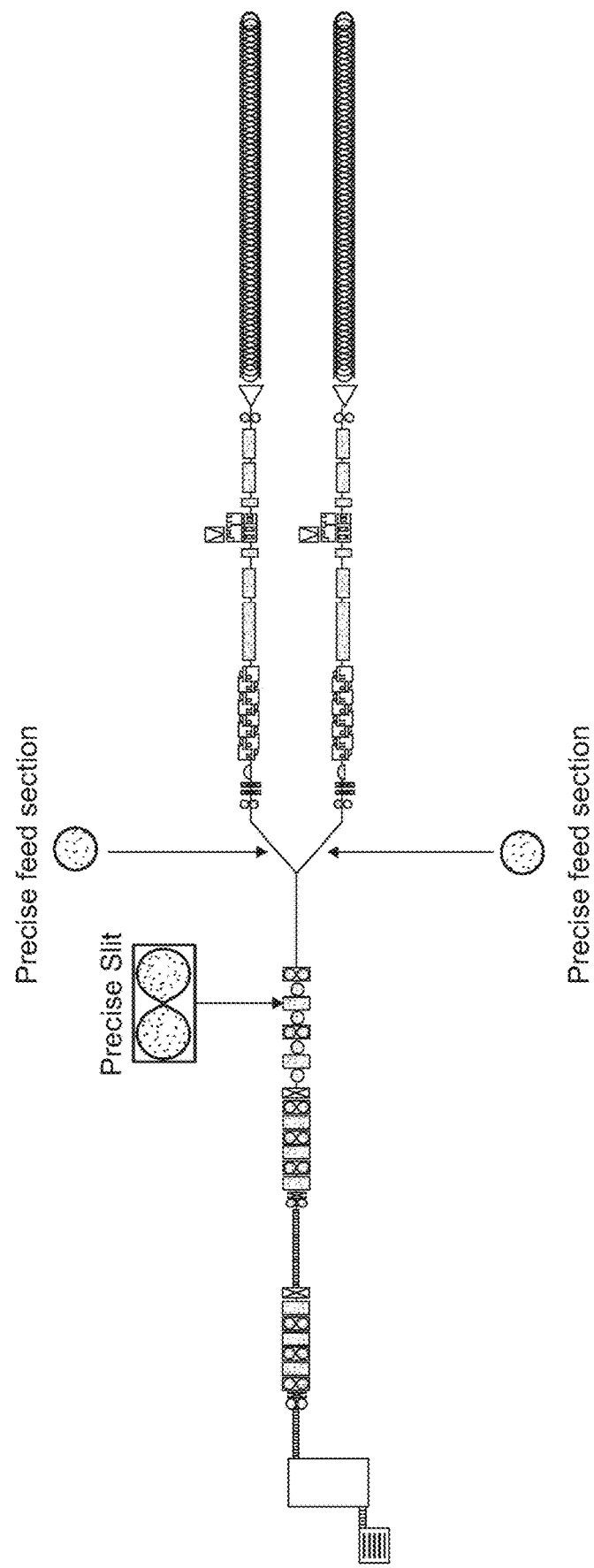
FIG. 5A depicts a long rolling plant comprising of a plurality of rolling stands to roll wire rod used in conjunction with the present invention.
Figure 5B:
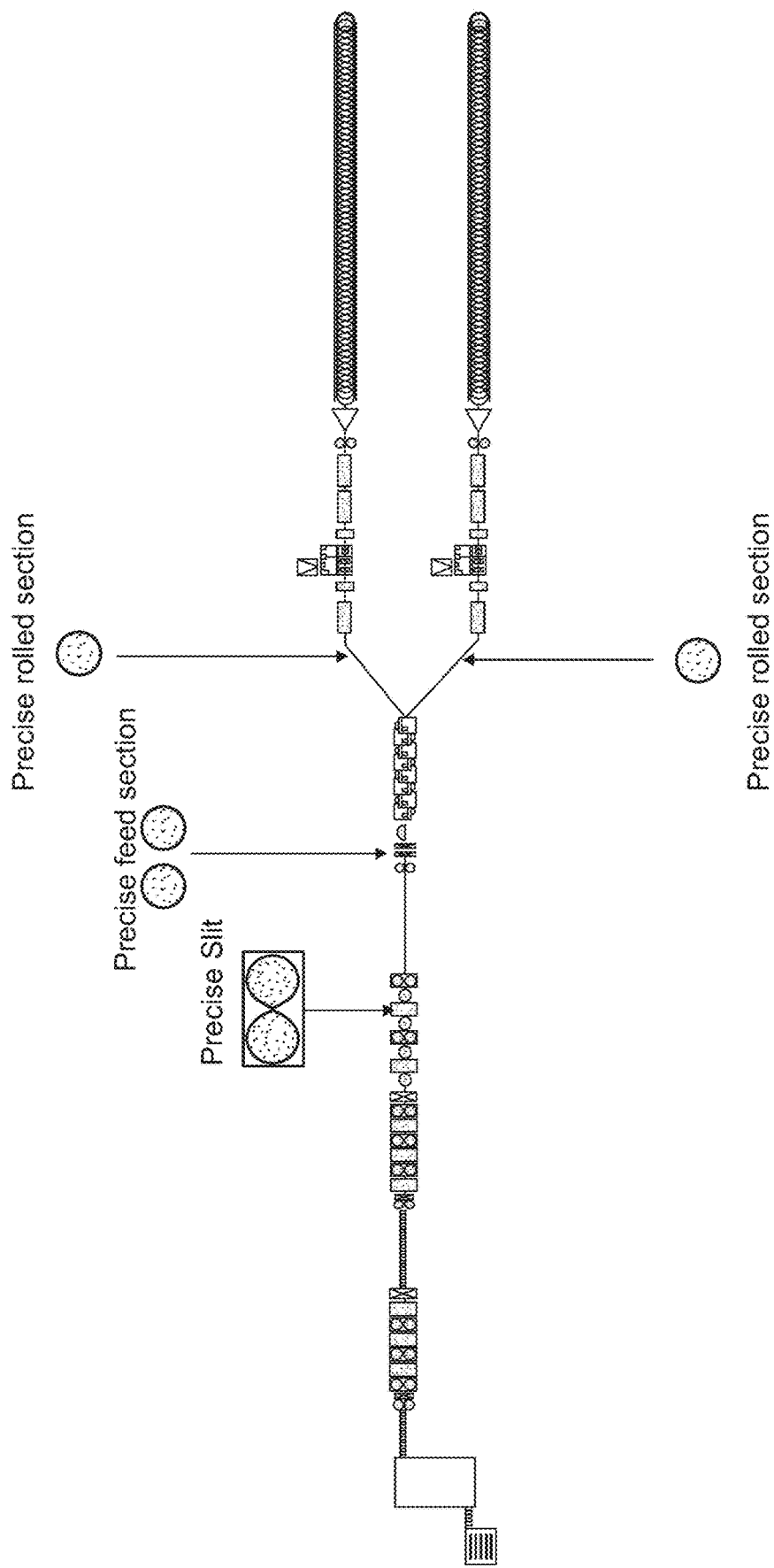
FIG. 5B depicts a similar arrangement to FIG. 5A, with the addition of an additional rolling arrangement that can only be utilized for quality round wire rod products for the automotive industry.

FIGS. 5A-5B depict different layouts of the wire rod mill as used in conjunction with the present invention. FIG. 5A depicts a typical long rolling plant comprising of a plurality of rolling stands to roll wire rod. Typically in this arrangement, the only product that could be produced when slitting the asymmetrical section would be rebar or deformed bar product as the torn section of the rib mentioned earlier is always evident in the finished material from the plant. However, utilizing the present invention, the plant can now produce quality material in the same manner, quality material being that material used for structural components where material shape surface finish is an important factor. This material can now be produced at double the rate than before when the plant was restricted to a single line finishing arrangement. FIG. 5B depicts a similar arrangement with the addition of an additional rolling arrangement that can only be utilized for quality round wire rod products for the automotive industry allowing finished product quality to be further improved.

The present invention provides the ability to take one billet and produce a slit section that can be cut into two acceptable feed sections and then rolled to a quality round wire rod. This billet could then become a direct cast feed from a caster without the need to slow caster production when rolling small products on the mill line. This has significant cost advantages to the operator of the mill as now all product can be produced as prime and billets do not need to be sold.

As noted previously in the background section, the current state of the art method results in rolling multiple billets at the same time increasing the equipment cost and increasing the difficulty to roll a quality material.

The benefits of the present invention over prior art methods are reduced conversion cost for the most profitable small product production. A high-grade reinforcing round steel bar (HSRB) mill could be modified to produce not only re-bar products but quality rod in straight lengths of similar size. A constant production rate allows the introduction and stabilization of Winlink to the rolling mill process. WinLink® permits the endless or semi-endless direct-rolling of long products from liquid steel without interruption. A high-speed caster is directly linked to a high-availability rolling mill, where the conventional billet furnace is replaced by an advanced induction unit. With smaller transformation costs, significant energy savings, higher yield, smaller land requirements and reduced emissions of carbon dioxide, a WinLink® micro-size Mini Mill can be as competitive and attractive as a larger traditional Mini Mill.

The present invention is useful for business because the wire rod mill will always be running at an efficient rate compared to the re-heat furnace. The re-heat furnace could be removed as the fixed production rate allows for direct casting to the mill process.

The advantages of the present invention over previous solutions are increased production of quality materials of smaller sizes that typically sell for higher profits, the ability to utilize this solution with a continual cast rolling mill and keep a stable caster rate for all products to be rolled in the mill, the possibility to finish roll two quality round sections on finishing mill, and to roll quality round material.

CONCLUSION

A system and method have been shown in the above embodiments for the effective implementation of a high production quality round wire rod using a slit rolling process. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A slit section pass formation unit comprising:
   a pair of rolls, the pair of rolls having a roll profile configured to produce a pair of slit rods with symmetrical dimensions as part of a slitting process, the pair of slit rods connected via a rib; and
   a de-ribbing means to remove entirety of the rib forming a first slit rod and a second slit rod,
   wherein the de-ribbing means comprises: at least one upper die, at least one lower die, and a track,
   wherein the at least one upper die and the at least one lower die are shaped to correspond to a symmetrical cross-section of the slit rods,
   wherein the at least one upper die and the at least one lower die are configured to interface with each other to remove entirety of the rib, thereby ensuring the symmetrical cross-section of the slit rods, and
   wherein the de-ribbing means is configured to operate as a separate step from the slitting process to ensure removal of entirety of the rib.

2. The slit section pass formation unit of claim 1, wherein the slit section pass formation unit is part of a wire rod mill.

3. The slit section pass formation unit of claim 1, wherein, given a speed of the pair of slit rods in the slitting process, Vs, the track is configured to be driven at a speed, Vr, wherein Vr is greater than Vs by up to 3%.

4. The slit section pass formation unit of claim 1, wherein the slit section pass formation unit comprises a first finishing line and a second finishing line, where the first and second slit rods are produced in the first and second finishing lines, respectively.

5. The slit section pass formation unit of claim 1, wherein the slit section pass formation unit comprises a combined finishing line/mill, where the first and second slit rods are processed concurrently at the combined finishing line/mill.

6. A slit section pass formation unit comprising:
   a pair of rolls, the pair of rolls having a roll profile configured to produce a pair of slit rods with symmetrical dimensions as part of a slitting process, the pair of slit rods connected via a rib; and
   a de-ribbing means to remove entirety of the rib forming a first slit rod and a second slit rod,
   wherein the de-ribbing means comprises an abrasive wheel or cutting wheel configured to completely remove entirety of the rib, thereby ensuring a symmetrical cross-section of the slit rods, and
   wherein the de-ribbing means is configured to operate as a separate step from the slitting process to ensure removal of entirety of the rib.

7. A slit section pass formation unit comprising:
   a pair of rolls, the pair of rolls having a roll profile configured to produce a pair of slit rods with symmetrical dimensions, the pair of slit rods connected via a rib; and
   a de-ribbing means to remove the rib forming a first slit rod and a second slit rod,
   wherein the de-ribbing means comprises an interlocking slit roll arrangement mounted on a track,
   wherein, given a speed of the pair of slit rods, Vs, the track is configured to be driven at a speed, Vr, wherein Vr is greater than Vs by up to 3%, and
   wherein the interlocking slit roll arrangement is either directly incorporated into each of the pair of rolls in a rolling stand or into another pair of rolls of a guide following a rolling stand associated with the pair of rolls,
   wherein the interlocking slit roll arrangement is configured to remove an entirety of the rib, thereby ensuring a symmetrical cross-section of the slit rods.

* * * * *